(12) United States Patent
Olson et al.

(10) Patent No.: US 10,474,372 B1
(45) Date of Patent: Nov. 12, 2019

(54) OPTIMIZING GEOMETRY BASED ON WORKLOAD CHARACTERISTICS

(71) Applicant: Amazon Technologies, Inc., Seattle, WA (US)

(72) Inventors: Marc Stephen Olson, Bellevue, WA (US); Marc John Brooker, Seattle, WA (US); Tarun Goyal, Seattle, WA (US); Arpit Tripathi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 14/536,458

(22) Filed: Nov. 7, 2014

(51) Int. Cl.
*G06F 3/06* (2006.01)

(52) U.S. Cl.
CPC ............ *G06F 3/0617* (2013.01); *G06F 3/065* (2013.01); *G06F 3/067* (2013.01); *G06F 3/0644* (2013.01)

(58) Field of Classification Search
CPC .. G06F 8/441; G06F 9/5077; G06F 2212/152; G06F 12/02; G06F 17/30292; G06F 9/5061; G06F 17/30575; G06F 2009/45579; G06F 21/575; G06F 3/00; G06F 3/06–0689; G06F 5/00–16; G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211;

(Continued)

(56) References Cited

U.S. PATENT DOCUMENTS 5,983,239 A * 11/1999 Cannon ............. G06F 17/30138
6,216,202 B1 * 4/2001 D'Errico ............... G06F 3/0607
711/112

(Continued)

OTHER PUBLICATIONS

Managing SLAs of heterogeneous workloads using dynamic application placement; Carrera et al.; Proceedings of the 17th international symposium on High performance distributed computing, pp. 217-218; Jun. 23-27, 2008 (Year: 2008).*

(Continued)

*Primary Examiner* — Daniel C. Chappell
(74) *Attorney, Agent, or Firm* — Davis Wright Tremaine LLP

(57) ABSTRACT

A system and method for provisioning a volume and repartitioning a provisioned volume based at least in part on a workload. A request to provision a volume of a specified size is received, a first set of partition options is determined based at least in part on the specified size, and second set of partition options is determined based at least in part on one or more performance characteristics. A volume partitioning is determined based at least in part on an intersection of a number of partitions between the first set of partition options and the second set of partition options, and further based at least in part on a set of optimization criteria. Based at least in part on tracked usage of the volume or a repartition request, a determination is made to repartition the volume such that the partitioning scheme fulfills a set of optimization criteria.

22 Claims, 8 Drawing Sheets

(58) Field of Classification Search
CPC ........ G06F 2213/00–4004; G06F 2216/00–17; G06F 2221/00–2153

See application file for complete search history.

(56) References Cited

U.S. PATENT DOCUMENTS

| | | | | |
|---|---|---|---|---|
| 6,401,183 | B1* | 6/2002 | Rafizadeh | G06F 3/0605 711/170 |
| 7,293,191 | B1* | 11/2007 | Arumugham | G06F 11/2007 714/5.11 |
| 7,937,281 | B2* | 5/2011 | Miller | G06Q 10/06 705/7.12 |
| 8,082,234 | B2* | 12/2011 | Brown | G06F 16/27 707/690 |
| 8,539,197 | B1* | 9/2013 | Marshall | G06F 13/00 711/112 |
| 8,595,346 | B2* | 11/2013 | Bairavasundaram | G06F 9/5011 709/223 |
| 9,049,204 | B2* | 6/2015 | Bairavasundaram | G06F 9/5011 |
| 2006/0053250 | A1* | 3/2006 | Saze | G06F 3/0608 711/114 |
| 2008/0104347 | A1* | 5/2008 | Iwamura | G06F 11/2076 711/162 |
| 2011/0218966 | A1* | 9/2011 | Barnes | G06F 11/1451 707/645 |
| 2013/0124807 | A1* | 5/2013 | Nielsen | G06F 11/1438 711/162 |
| 2014/0229757 | A1* | 8/2014 | Danayakanakeri | G06F 11/2038 714/4.11 |
| 2015/0278331 | A1* | 10/2015 | Blea | G06F 17/30575 707/610 |
| 2016/0110111 | A1* | 4/2016 | Song | G06F 3/0607 711/103 |

OTHER PUBLICATIONS

A state-space approach to SLA based management; Kumar et al.; IEEE Network Operations and Management Symposium; Apr. 7-11, 2008 (Year: 2008).*

Distributed workload and response time management for web applications; Zhang et al.; 7th International Conference on Network and Service Management; Oct. 24-28, 2011 (Year: 2011).*

Statistical workload shaping for storage systems; Wang et al.; International Conference on High Performance Computing; Dec. 16-19, 2009 (Year: 2009).*

On the Use of Fuzzy Modeling in Virtualized Data Center Management; Xu et al.; Fourth International Conference on Autonomic Computing; Jun. 11-15, 2007 (Year: 2007).*

* cited by examiner

OPTIMIZING GEOMETRY BASED ON WORKLOAD CHARACTERISTICS

BACKGROUND

The use of remote computing services, such as remote program execution services and remote data storage services has greatly increased in recent years. Customers may purchase these services from a computing resource service provider and customer applications may be distributed over multiple virtual machine instances running on one or more computing systems. In many cases, these virtual machine instances run under a virtualization layer that exposes a logical volume using a block-level storage device on a data storage server for storage. However, determining how a block-level storage volume should be partitioned for optimal performance can be challenging, particularly when different partitioning schemes perform differently depending on volume usage and the state of the computer system.

BRIEF DESCRIPTION OF THE DRAWINGS

Various embodiments in accordance with the present disclosure will be described with reference to the drawings, in which.

DETAILED DESCRIPTION

Figure 1:
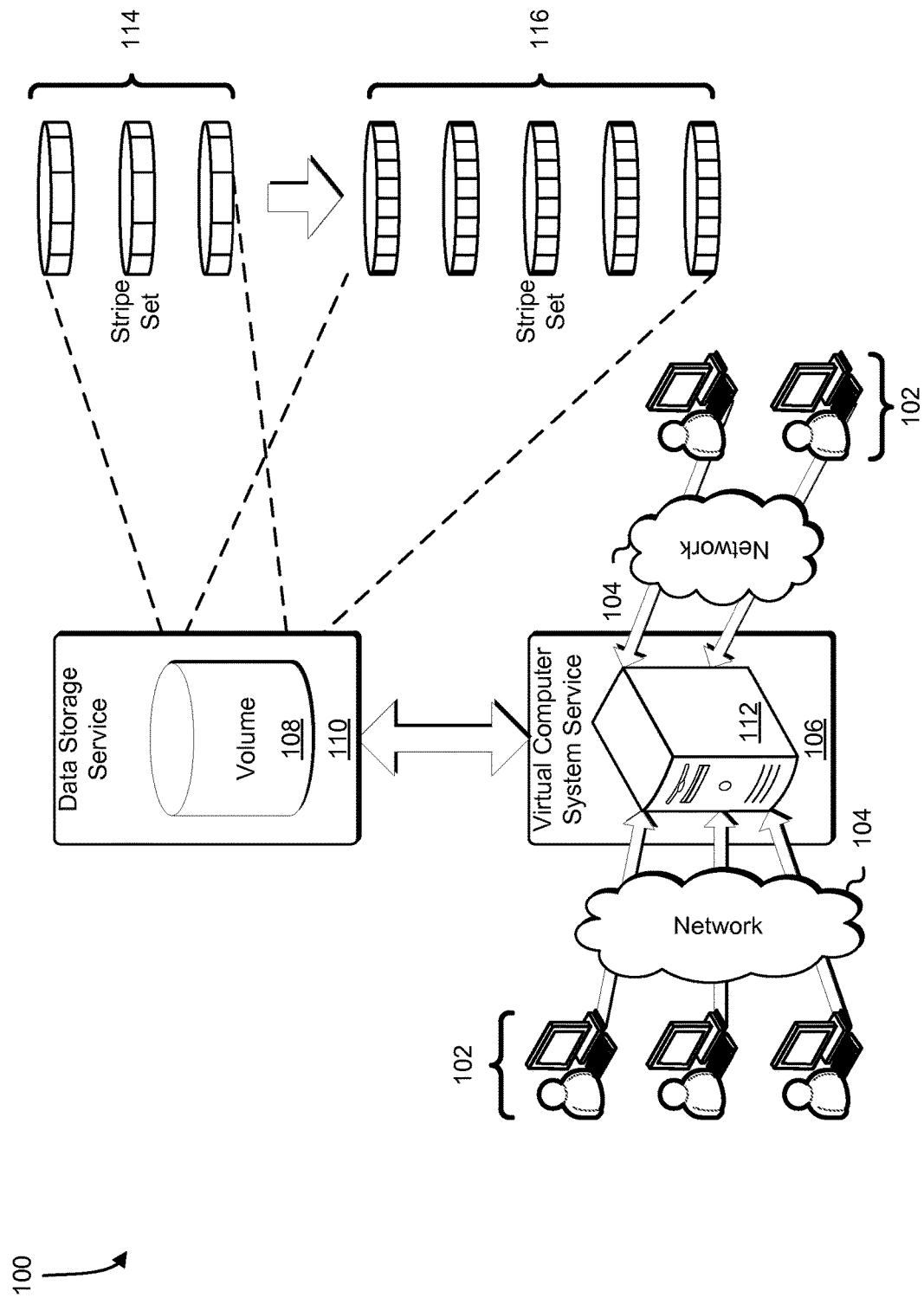
FIG. 1 illustrates an example of optimizing geometry based on workload characteristics in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for enhancing the performance of data storage services provided by a computing resource service provider to customers of the computing resource service provider. Such data storage services may include one or more network-attached block-level data storage devices, such as block-level storage devices, and/or databases. The performance enhancement provided by present disclosure enables such data storage devices to dynamically determine a partitioning strategy for the storage devices based on information such as available space, hot spots, volume type, available input/output operations per second, and attachment target in order to achieve a performance balance of speed and consistency.

In some embodiments, a customer requests that a volume be provisioned to meet one or more parameters and/or performance characteristics, such as a volume size and a number of input/output operations per second (e.g., minimum number of input/output operations per second, average input/output operations per second, etc.). In the system of the present disclosure, a partitioning scheme may be heuristically determined that meets the requirements of the customer for the volume. In some implementations, the customer only requests that a volume of a specified size be generated, and the system of the present disclosure may consider a number of factors in a decision tree to determine a partitioning scheme for the volume that meets specified criteria for input/output operations per second. In some embodiments, different sets of partitions can be concatenated to form a larger volume than could be formed from a set of partitions on a single computing system.

In some embodiments, the system of the present disclosure tracks input/output operations to and from the volume to determine an input/output profile, which also referred to as an input/output pattern. Based on this input/output profile, the system determines whether the volume should be repartitioned, and if so, how the volume should be repartitioned. Alternatively or additionally, the system may make the determination based on historical information reflecting usage of other volumes of similar types, sizes, and usage patterns. The system, in these cases, may also estimate an expected lifespan of the volume based on similarities between the volume type and usage and past (i.e., historical) volumes tracked by the system. This expected lifespan, and the current age of the volume, may also be factored into the determination whether to repartition the volume.

Once the determination is made to repartition a volume, the input/output profile may be analyzed to determine a partition scheme for optimizing the volume. In some embodiments, the partition scheme is determined such that a service-level agreement between the customer and computing resource service provider for the volume remains in compliance. In some embodiments, the partition scheme is determined in order to adjust to a change in usage for the volume; e.g., the primary input/output profile may have shifted from sequential writes to random reads. In some embodiments, another factor in determining the repartitioning scheme is to reduce data hot spots; e.g., the number of partitions may be increased and size of each partition may be reduced in order to distribute the hot spot data across a wider array of partitions. In some embodiments, a stripe depth or stripe size of a set of partitions can be resized for certain types of data in order to avoid hot spots.

The described and suggested techniques improve the field of computing, and specifically the field of data storage, by providing a new and useful system for dynamically optimizing the performance of data storage volumes. Additionally, the described and suggested techniques improve the functioning of computer systems by performing targeted repartitioning of striped data volumes in order to improve performance of data storage volumes based on information collected about the actual usage of the volume. Moreover, the described and suggested techniques offer meaningful advantages over general drive partitioning schemes by allowing the partitioning of a volume to be dynamically rebalanced to optimize performance of a volume as usage of the volume changes over time and to dynamically rebalance a volume to maintain compliance with service-level agreements between customers and computing resource service providers.

FIG. 1 illustrates an aspect of an environment 100 in which an embodiment may be practiced. As illustrated in FIG. 1, the environment 100 may include one or more users 102 connecting through a network 104 to a virtual machine instance 112 of a virtual computer system service 106 that is attached to a volume 108 of a data storage service 110. The volume 108 may be comprised of a set of striped partitions 114, which, based at least in part on the workload placed on the volume 108 by the users 102, may be repartitioned into a second stripe set 116 to improve the performance of the volume 108 under the workload. In some examples, the term "attached" may refer to a state where a computer system instance (e.g., a virtual machine instance or a physical machine) recognizes the volume, and vice versa, and that an operating system of the computer system instance is able to perform input/output operations with the volume. Likewise, in some examples, a volume that is "detached" from a computer system instance is no longer recognized by the operating system of the computer system instance and such computer system instance is unable to perform input/output operations with the volume.

As noted, the present disclosure describes a system for dynamically determining a partitioning strategy for optimized geometry of data storage devices such as network-attached block-level storage devices and databases. In some examples, a "volume" may be a logical storage space within a data storage system in which data objects may be stored. The volume 108 may be identified by a volume identifier. Data for the volume 108 may reside in one physical storage device (e.g., a hard disk) or span across multiple storage devices; e.g., the set of striped partitions 114. In some examples, a "partition," "storage partition," or "data storage partition" may refer to a section of a computer-readable storage medium that has been allocated to serve as logical storage for a volume. Such computer-readable storage mediums include, but are not limited to, magnetic media drives, solid state media, flash-based storage media, non-volatile memory, dynamic random access memory, and other types of hard drives and persistent storage. A volume may be comprised of a set of one or more partitions. For improved performance and fault tolerance, each partition of the set of partitions may reside on a different hard drive, however partitions assigned to different volumes may reside on the same hard drive. For example, a first volume may be comprised of partitions A, B, C, and D on hard drives W, X, Y, and Z respectively, and a second volume may be comprised of partitions E, F, G, and H also on respective hard drives W, X, Y, and Z. In some examples, "geometry" may refer to how a volume is partitioned. Partitioning strategy for optimizing volume geometry may be based on information that achieves a performance balance of speed and consistency, such as available space, hot spots, volume type, throughput (e.g., megabytes per second), available input/output operations per second, and attachment target. In some examples, "attachment target" may refer to the machine or virtual machine instance to which the volume is attached. A partitioning strategy based on the attachment target may take into account where the attachment target is located, performance characteristics of the attachment target, and aspects of the network (e.g., network bandwidth and latency) between the attached volume and the attachment target.

The combination software and hardware configured to determine the partitioning strategy in the manner described in the present disclosure may be referred to as the "partitioning engine." In some examples, a "hot spot" may refer to frequently accessed data blocks of the block-level storage device. In some examples, "volume type" may refer to the configuration or purpose of the volume 108; for example, whether the volume 108 is configured to be boot volume, intended to be used as a data volume, or a volume expected to serve some other purpose.

In a distributed computing environment of a computing resource service provider, one or more virtual machine instances running emulations of computer systems, such as the virtual machine instance 112, may be configured to run on one or more computer systems of the distributed computing environment and may be made available to customers of the computing resource service provider. The customers of the computing resource service provider may provide their own operating system and applications to run on their respective virtual machine or may install an operating system and applications provided by the computing resource service provider on their respective virtual machine. Some computing resource service providers provide block-level storage services and database services to their customers. Such computing resource service providers may allow their customers, through an application programming interface function call, to create a data storage volume, such as the volume 108, of a specified size and attach the storage volume to their virtual machine instance such that the storage volume appears in the virtual machine instance as storage device, similar to a Universal Serial Bus hard drive.

In some cases, the customer or computing resource service provider may take a snapshot of a data storage volume and restore the snapshot into a different data storage volume. In addition, in some cases, the customer or computing resource service provider may detach the data storage volume from one virtual machine instance and attach it to a different virtual machine instance. Application programming interface calls to a block-level storage service or database service may include function calls for creating a volume, taking a snapshot, attaching a volume to a virtual machine instance, detaching a volume from a virtual machine instance, deleting a volume, encrypting a volume, and decrypting a volume.

The users 102 depicted in FIG. 1 may be clients, subscribers, or other users of virtual machine, such as a website, of a customer of the computing resource service provider. For example, each of the users 102 may be streaming music or video from a streaming website of the customer. As another example, each of the users 102 may be uploading images to a photo repository site of the customer. As still another example, the virtual machine instance 112 could host a social networking site and each of the users 102 may be subscribers of the site and may be posting messages, reading messages, and exchanging files to and from the virtual machine instance 112 and the volume 108. As one more example, the users 102 may be shoppers on an online marketplace hosted on the virtual machine instance 112 and the volume 108, and purchase history of the shoppers and inventory information of the seller may be stored on the volume 108.

The network 104 may be any appropriate communication network, including an intranet, the Internet, a cellular network, a local area network, or a satellite network, through which the users 102 may communicate with one or more virtual machine instances of the virtual computer system service 106. The virtual computer system service 106 may host virtual machine instances for itself or for customers, similar to the virtual computer system service 708 described in conjunction with FIG. 7. The data storage service 110 may be any appropriate service that provides data storage for customers, similar to the block-level data storage service 710 or on-demand data storage service 714 of FIG. 7, and/or a database service.

In embodiments of the present disclosure, a single storage volume often appears to the users 102 as one disk drive and partition, but may actually span multiple partitions on multiple hard drives. Note that the same partitioning schemes discussed in this disclosure may also apply to non-striped volumes. For example, multiple partitions may be joined in a spanned (e.g., concatenated, but not striped) volume. Furthermore, in some cases, the system of the present disclosure may determine that only one partition is needed for the volume, and in such a case, the volume may comprise only a single non-striped, non-spanned partition. Likewise, the "volume" discussed in the present disclosure may be a database. For example, a single database may appear to the users 102 as a single, undivided database, but may actually be sharded across multiple partitions on multiple hard drives. The multiple hard drives may include any combination of magnetic hard drives, solid-state device hard drives, and other computer-readable storage media. For example, if a customer of a computing resource service provider requests to create a 16-terabyte volume, a block-level storage volume may be produced by the computing resource service provider by striping multiple block-level storage partitions (such as 16 one-terabyte partitions) together. In some cases, the striped partitions may be on the same physical machine as the customer's instance.

The set of striped partitions 114 may comprise one or more partitions, with each partition residing on a different hard drive of a computing system of the data storage service 110. For example, FIG. 1 depicts the volume 108 as comprised of the set of striped partitions 114, which are made of a set of three partitions across three respective hard drives. FIG. 1 also illustrates that, at a later time, the set of striped partitions 114 may be repartitioned into the second stripe set 116. The second stripe set 116 now spans five hard drives instead of three, and has a smaller stripe depth/size than the original set of striped partitions 114.

Figure 2:
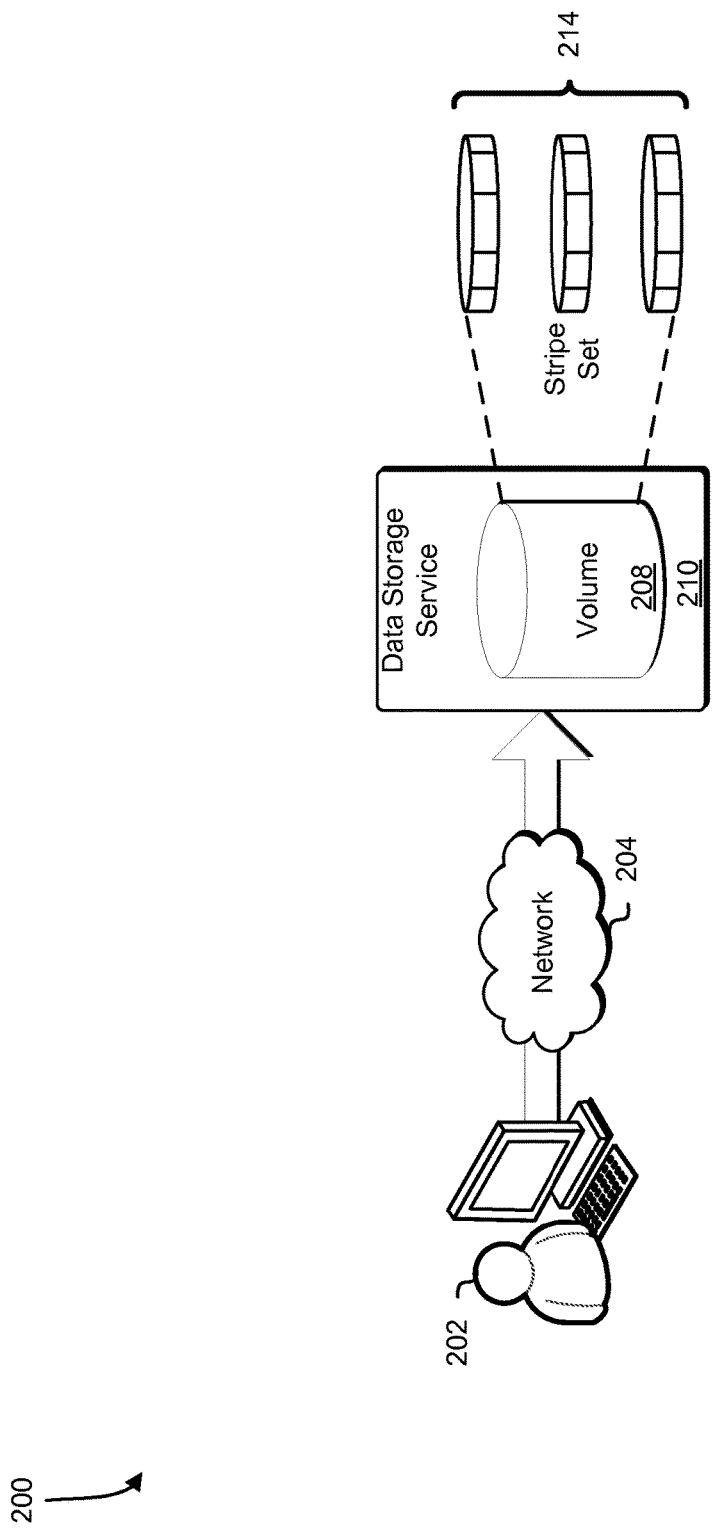
FIG. 2 illustrates an example of partitioning a volume in response to a customer request in accordance with an embodiment.

FIG. 2 illustrates an aspect of an environment 200 in which an embodiment may be practiced. Specifically, FIG. 2 depicts a customer 202 of a computing resource service provider communicating through a network 204 to a data storage service 210 of the computing resource service provider to have a volume 208 created from a set of striped partitions 214.

As depicted in FIG. 2, the customer 202 may request creation of the volume 208. In some cases, the data storage service 210 may be configured to receive requests for volume creation, volume deletion, volume snapshotting, attachment to computer system instances, and detachment from computer system instances. Such requests may be received through a web user interface or other user interface. Such a web interface may be configured, when executed by one or more processors of a computer system, to make application programming interface function calls to the data storage service through the network 204. Computer system instances may include any virtual or physical computer system that can attach to a volume of the present disclosure, including virtual machine instances provided by a virtual computer system service, computer systems provided by a computer system service, and the local computer system of the customer 202 or other entity, etc. As noted, the network 204 may be any appropriate network, and the network 204 is not necessarily a single network, but may represent multiple networks with intervening computer systems, virtual machine instances, and/or routers. The network 204 is intended to depict a network of communication that eventually reaches the data storage service 210.

As noted, the volume 208 may be configured to perform as a logical data storage volume or database. The volume may comprise one or more partitions striped across respective one or more hard drives of a computer system. The set of striped partitions 214 may be configured according to a partitioning scheme determined by the data storage service 210 of a computing resource service provider. The environment 200 of FIG. 2 depicts a customer requesting creation of the volume 208, whereupon the data storage service 210 determines a partitioning scheme and configures the volume according to the partitioning scheme. In the environment 200, the partitioning scheme has resulted in the creation of a volume comprising three partitions across three hard drives.

In some examples, a "stripe" may refer to the input/output blocks of data that are written to or read from the volume partition. The term "stripe" may also be used as a verb to describe writing stripes to each volume partition. An example of striping is found in a redundant array of independent disks zero (RAID 0) arrays. In some examples, "stripe depth" may refer to the input/output block size that is written to the individual partition. In some examples, "stripe width" may refer to the number of drives/partitions in the stripe set. For example, a 12-terabyte volume striped over four drives would have a stripe width of four. In some examples, "stripe size" may refer to the product of the stripe width multiplied by the stripe depth.

Performance characteristics that may be used or considered when determining a partitioning scheme include a maximum stripe size, a minimum stripe size, maximum input/output operations per second per stripe, and minimum input/output operations per second per stripe. In some situations, volumes having more partitions are preferred over volumes having fewer partitions because the aggregation of hot spots (also referred to as "input/output heat") may be more dispersed, resulting in more uniform utilization of the partitions of the volume. In other situations, volumes having fewer partitions are preferred over volumes having more partitions because having fewer partitions may improve volume durability and availability by reducing the risk of correlated failures between hard drives of the same volume. In some situations, volumes having more partitions are preferred over volumes having fewer partitions because more partitions may reduce the likelihood of correlated load (e.g., input/output operations requiring a lot of hard drive activity due to a narrow stripe width) by spreading the load among the partitions. In some cases, certain stripe widths may be preferred for random read/write workloads, while certain other stripe widths may be preferred for sequential workloads.

The type of hard drive media may affect the determination of the partitioning scheme as well. For example, it may be desirable to avoid the performance cost of moving the read/write head of a magnetic hard drive as much as possible. Consequently, in some situations, volumes having more partitions may be preferred over volumes having fewer partitions for magnetic hard drives, as a narrower stripe width increases the likelihood that an input/output operation may occur at one or more stripe boundaries, which may require moving more drive heads than would be needed with a wider stripe width.

In some embodiments, a customer of a computing resource service provider specifies a desired volume size and one or more performance characteristics, such as a number of input/output operations per second, when requesting to create a data storage volume of a block-level storage service or database service. Then, the block-level storage service or database service determines the size and number of partitions sufficient to generate a volume having the requested size and input/output operations per second. In some cases, a customer may request to create a one-terabyte drive, and the data storage service may generate a volume with a single one-terabyte partition on a single drive. In other cases, the requested volume size may exceed the size the data storage service can support with a single partition; for example, if a data storage service limits maximum partition sizes to one-terabyte, fulfilling a customer request for a 16-terabyte volume may involve creating multiple partitions of sizes one-terabyte or less across which to stripe the volume.

Likewise, the number of partitions may affect the number of input/output operations per second the volume may be capable of supporting. For example, a single partition may only be able to perform a maximum of 1,000 input/output operations per second. In this example, if a customer of a computing resource service provider requests for a volume having 4,000 input/output operations per second, multiple partitions may need to be created to form a volume capable of achieving the requested 4,000 input/output operations per second. In some embodiments, other performance characteristics in addition or alternative to size and input/output operations per second can be specified. Such other performance characteristics may include latency of performing input/output operations, throughput (e.g., megabytes per second), network path latency and/or bandwidth, or parameters relating to the layout of the distributing computing environment (e.g., distance between the physical machine supporting the customer's virtual machine instance and the physical machine supporting the data storage volume, etc.). In some implementations, volumes may not comprise striped partitions but may comprise a spanned "just a bunch of disks" partitions. In such implementations, the partitions may of the same or different sizes and be concatenated in a linear manner to form the data storage volume.

In some embodiments an analyzed or estimated workload for the volume is used to generate a volume such that it is configured (e.g., partitioned) to perform optimally under that workload. Partitioning schemes may perform differently depending on the workload, and different workloads may exhibit different performance based on the particular partitioning scheme of the volume. Some partitioning schemes may also result in more efficient use of space (e.g., less wasted space) than other partitioning schemes. In some embodiments, a partitioning scheme is determined for a volume based on historical workload, usage, size, and performance characteristics of other volumes. For example, a boot volume may be partitioned according to a partitioning scheme that has been known to provide optimal performance (e.g., most input/output operations per second per amount of wasted space) for similar boot volumes. In some embodiments, usable in combination with other embodiments, a partitioning scheme is initially determined for a data storage volume. In these embodiments, based on tracked usage of the volume, the data storage volume can be repartitioned in order to improve performance of the volume and/or to maintain compliance with a service-level agreement, such as a requirement that the volume perform at a specified number of input/output operations per second, between the customer and the computing resource service provider for the volume.

Where a volume is comprised of multiple partitions, a logical-to-physical block map may be used to determine the partition and storage location for each data block. This block map may be used by software (e.g., the data storage client software) residing on the physical machine hosting the data blocks. Reads and writes of data blocks to the volume may then be made through an interface to the software such that the physical machine and/or the customer of the computing resource service provider need not be aware of the exact physical location of the data blocks. In some embodiments, the software and the logical-to-physical block map resides on a different physical machine than the physical machine hosting the data.

In some of embodiments, the volume 208 is repartitioned in response to a request from the customer 202 to change the size or performance characteristics (e.g., input/output operations per second) of the volume 208, whereas in others of these embodiments, the volume is repartitioned automatically based on the workload of the volume. In some cases, there may be a set of criteria to determine when, or if, a volume should be striped across multiple partitions (partitioned). In some examples, the set of criteria may specify that a volume should be partitioned if padding (i.e., wasted space) would exceed a threshold (e.g., 2% of volume size). Additionally or alternatively, the threshold padding amount may vary according to volume size. For example, the set of criteria may specify that volume should be partitioned if padding exceeds 2% for volumes of 250-gigabytes or less, if padding exceeds 1% for volumes between 250-gigabytes and 500-gigabytes, and if padding exceeds 0.5% for volumes exceeding 500-gigabytes.

In some examples, the set of criteria may specify that volumes exceeding a specified number of input/output operations per second (e.g., 500 input/output operations per second) should be partitioned. Similarly, in some examples, the set of criteria may specify that volumes exceeding a specified size (e.g., above 512-gigabytes) should be partitioned. In some examples, the set of criteria may specify that volumes to be partitioned should be created to have as many partitions as the physical machine hosting the data volume can support. In other examples, the set of criteria may specify that volumes be partitioned to have as few partitions as possible to meet a minimum volume size and input/output operations per second. In still other examples, the set of criteria may specify that partitions should be of a specified size (e.g., multiples of 128-, 256-, or 512-gigabytes).

As an example, a set of criteria may specify that the number of partitions for a volume correlates to the overall size of the volume. When a customer of the computing resource service provider requests creation of a volume of a specified size, the computing resource service provider may utilize the example options below when determining an appropriate partitioning scheme:

| Volume Size (terabytes) | |
| --- | --- |
| Less than 1 | 1 Partition |
| More than 1, Less than 2 | 2 Partitions |
| More than 2, Less than 4 | 4 Partitions |
| More than 4, Less than 8 | 8 Partitions |
| More than 8, Less than 16 | 16 Partitions |

Thus, in the above example, if a customer requests creation of a six-gigabyte volume, the computing resource service provider may create the volume from eight partitions as described in the present embodiment. As another example, it may be known by a computing resource service provider that each partition may support 1,250 input/output operations per second (iops). When a customer of the computing resource service provider requests creation of a volume of a specified size and number (e.g., minimum, average, etc.) of input/output operations per second, the computing resource service provider may utilize the example options below when determining an appropriate partitioning scheme:

| Volume Size (terabytes) | 1,250 iops | 2,500 iops | 5,000 iops | 10,000 iops | 20,000 iops |
| --- | --- | --- | --- | --- | --- |
| Less than 1 | 1 Partition | 2 Partitions | 4 Partitions | 8 Partitions | 16 Partitions |
| More than 1, Less than 2 | N/A | 2 Partitions | 4 Partitions | 8 Partitions | 16 Partitions |
| More than 2, Less than 4 | N/A | N/A | 4 Partitions | 8 Partitions | 16 Partitions |
| More than 4, Less than 8 | N/A | N/A | N/A | 8 Partitions | 16 Partitions |
| More than 8, Less than 16 | N/A | N/A | N/A | N/A | 16 Partitions |

Thus, in this example, if a customer requests creation of a three-gigabyte volume having 20,000 input/output operations per second, the computing resource service provider may create the volume from 16 partitions as described in the present embodiment.

In yet another example, it may be that the computing resource service provider guarantees at least a certain number, such as three, of input/output operations per second per gigabyte size of a volume and has a goal to keep latency below a threshold, such as ten-milliseconds per input/output operation. In such a case the partitioning options may resemble the following:

| Volume Size (gigabytes) | Partitions |
| --- | --- |
| 1-7 | 1 |
| 8-139 | 2 |
| 140-279 | 4 |
| 280-559 | 8 |
| 560-16,384 | 16 |

In this example, if a customer requests creation of a 140-gigabyte volume, the computing resource service provider can determine that, to meet the service-level agreement that such volume performs at three input/output operations per second and worst-case latency of 10-milliseconds, the volume should be created from four partitions. That is, if a 140-gigabyte volume is made from eight 17.5-gigabyte partitions, at three input/output operations per second per gigabyte, the volume would yield 52.5 input/output operations per second (or approximately 19-milliseconds of latency per partition), which would not satisfy the desired performance characteristics of keeping latency below ten-milliseconds. Whereas, a 140-gigabyte volume may be made from four 35-gigabyte partitions, which, at three input/output operations per second per gigabyte, would yield 105 input/output operations per second per partition (or approximately 9.5-milliseconds latency per partition), which would satisfy the desired performance characteristics.

Figure 3:
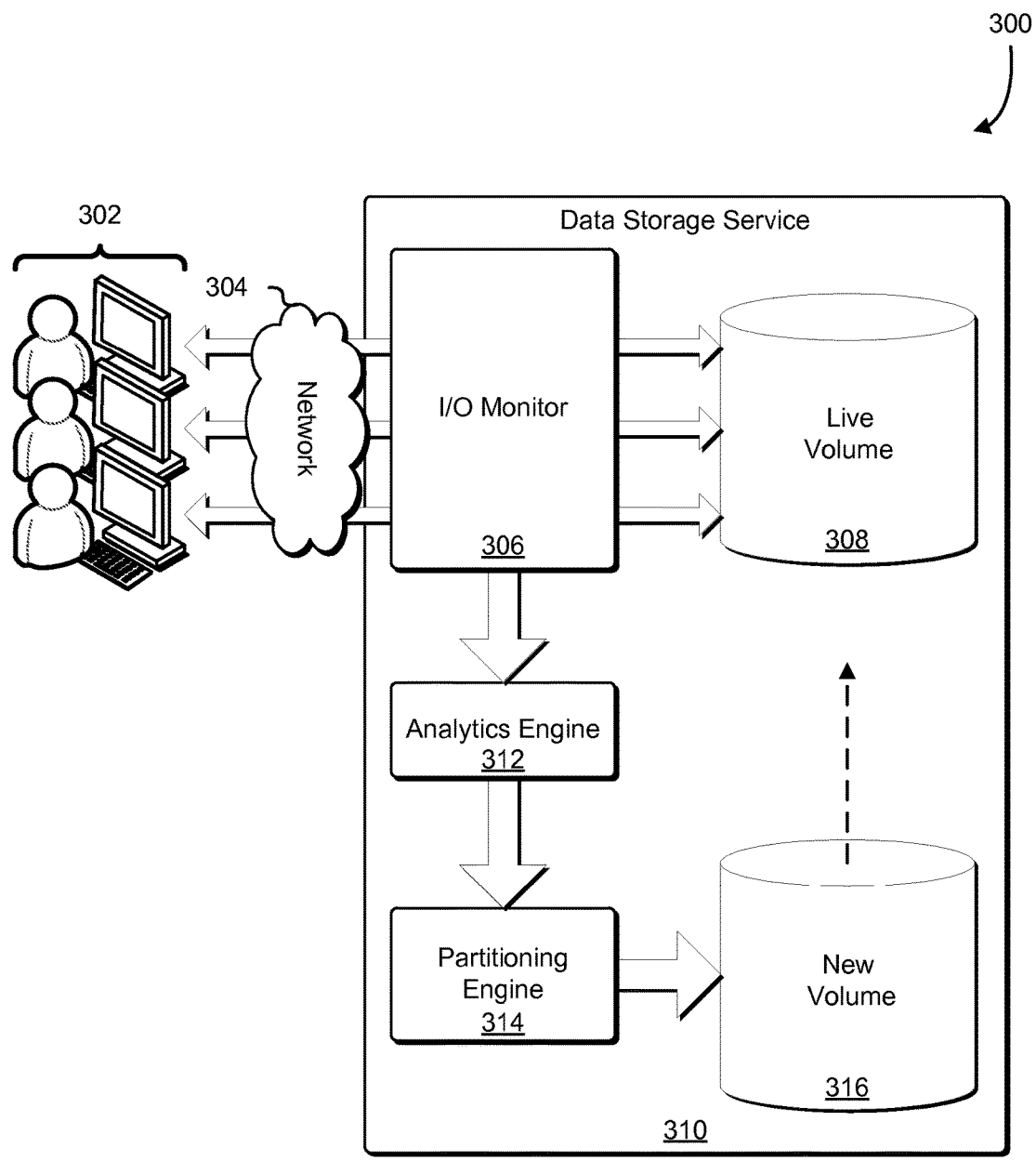
FIG. 3 illustrates an example of repartitioning a volume based on a workload in accordance with an embodiment.

FIG. 3 illustrates an aspect of an environment 300 in which an embodiment may be practiced. Specifically, FIG. 3 depicts the users 302 communicating through a network 304 to access data in a live volume 308 hosted by a data storage service 310. The input/output profiles of the workflow of the live volume 308 and the users 302 may be tracked by an input/output monitor 306. The data collected by the input/output monitor may be provided to an analytics engine 312 to determine whether a different partitioning scheme than the partitioning scheme of the live volume 308 would be a better fit for the workflow. If a different partitioning scheme is determined to be desirable, the analytics engine 312 may signal a partitioning engine 314 to determine a new partitioning scheme and partition/repartition a new volume 316 to replace the live volume 308.

The users 302 may be one or more users accessing the live volume 308. At times, the users may be causing data to be written to the live volume 308, and at other times, the users 302 may be causing data to be read from the live volume 308. For example, if the users 302 are shoppers perusing an online marketplace, images and details of the product on the online marketplace may be retrieved from the live volume 308. Similarly, if the users 302 purchase a product from the online marketplace, data related to the transaction may be stored in the live volume 308. In addition, in a case where the users 302 may be sellers on the online marketplace, the users 302 may upload product information and inventory information to be stored in the live volume 308.

As noted, the network 304 may be any suitable network for accessing data on the live volume 308, such as the networks 104 and 204 of FIGS. 1 and 2 respectively. The input/output monitor 306 may be a software or hardware component implemented on one or more computers or gateways of the data storage service 310. As noted, the data storage service 310 may be configured to provide data storage service to customers of a computing resource service provider, such as a customer operating an online marketplace in the manner described above. The input/output monitor may track usage data and volume activity (input/output information) to and from the live volume 308. After a certain amount of input/output data has been collected, the input/output monitor may provide the input/output data to the analytics engine 312 to determine whether the live volume 308 should be repartitioned. In some cases, the certain amount of data may be an amount of data collected over a specified time period, such as 48 hours, one week, or over a specified percentage of an expected lifespan of the live volume 308. In some examples, "repartitioning" may refer to configuring a new volume of with a determined partition scheme, copying the data from the old volume to the new volume, detaching the old volume from its virtual machine instance, and attaching the new volume to the virtual machine instance.

In some implementations, the live volume 308 may be repartitioned at the request of the customer owner of the live volume 308. In other implementations, the customer may request a change to the live volume 308, such as an increase or decrease in storage capacity or performance (e.g., input/output operations per second). In still other embodiments, information about how a volume is being used, such as may be collected by the input/output monitor 306, is gathered by the system of the present embodiment, and, based on the usage information the analytics engine 312 may determine whether and how to repartition the live volume 308.

In other implementations, a controlling domain of a virtualization layer, such as a hypervisor, may be configured to gather this usage data. In this context, usage data may include data such as amount of available space in the partitions, amount of wasted space in the partitions, and hot spot aggregation. In this context, volume activity may include data such as frequency of reads, frequency of writes, access frequency of stored data blocks, input/output operations per second of the live volume 308, and average read/write latency.

As noted, in some embodiments, the live volume 308 is repartitioned based on input/output profiles of the live volume 308. Using a data warehouse as an example, the data warehouse may operate in at least two stages: A first stage may be where a large amount of data is sequentially written to the live volume 308. After the data is sequentially written to the live volume 308, the data warehouse may operate in a second stage where the data is randomly (or in some other input/output pattern) read from the live volume 308. In this example, the live volume 308 may have a partition optimized for sequential writes for the first stage. Then, for the second stage, the live volume 308 may be repartitioned to be optimized for random (or some other input/output pattern) for the second stage.

After a certain amount of usage data is collected by the input/output monitor 306, the data may be sent to the analytics engine 312. The analytics engine 312 may be hardware or software implemented on one or more computers of the data storage service 310 and configured to determine, from the usage data, whether repartitioning of the live volume 308 may be in order. Based on the usage data, the analytics engine 312 may estimate the expected lifespan of the live volume 308 and the point where the live volume 308 may be in its expected lifespan. This estimation may be based on a comparison of the usage data against usage data collected about similar volumes created within the data storage service 310. For example, the analytics engine 312 may determine that that the live volume 308 is less than 48 hours old and the usage data gathered for the live volume contains characteristics that indicate similarities between the live volume 308 and volumes that are usually deleted within 48 hours. In such a case, the analytics engine 312 may determine that there is no need to repartition the live volume 308, as it is likely that the live volume 308 may be deleted soon. As another example, the analytics engine 312 may determine that the live volume 308 is one month old and contains characteristics that indicates similarities between the live volume 308 and volumes whose lifecycles exceed six months. In such a case, the analytics engine 312 may determine that, if repartitioning could improve the performance of the live volume 308, that the live volume may 308 be a candidate for repartitioning.

In some cases, the analytics engine 312 may determine to repartition the live volume 308 for the purpose of defragmenting the data on the live volume 308. In other cases, a volume may be repartitioned for the purpose of recovering wasted space within the live volume 308. In other instances, a volume may be repartitioned for the purpose of redistributing hot spot data. In such instances, the number of the partitions in the live volume 308 stripe set may be increased and the size of the partitions be correspondingly decreased in order to spread out the hot spot data among the partitions. For example, a 16-terabyte volume comprising eight two-terabyte partitions may be repartitioned into a volume having 16 one-terabyte partitions.

In some other cases, the data storage servers may be multi-tenant systems where multiple customers of a computing resource service provider have volumes hosted on the same physical machine. In these cases, as multiple, striped volumes are created and deleted on the physical machine, the hard drives of the physical machine may end up with wasted, unallocated space, which, based on size or location on the drive, may be impossible or impractical to use for a volume. In such a case, repartitioning volumes and moving volumes around to different physical machines may more efficiently make use of the available storage space on the hard drives of the physical machines.

As noted, in other cases, the live volume 308 may be repartitioned by the data storage service 310 in response to a customer request to increase or decrease the size of the live volume 308. For example, the live volume 308 may currently be a two-gigabyte volume and the customer owner may request that the live volume 308 size be increased to five-gigabytes. Alternatively, as another example, the live volume 308 may currently be a five-gigabyte volume and the customer owner may request that the live volume 308 size be decreased to two-gigabytes. In still other cases, the live volume 308 may be repartitioned in response to a customer request to increase or decrease the input/output operations per second of the live volume 308. For example, the live volume 308 may currently perform at 10,000 input/output operations per second, and the customer owner may request that the live volume 308 be changed to support 20,000 input/output operations per second, or vice versa.

Once it is determined to repartition the volume, such as in response to a customer request or as determined by the analytics engine 312 analysis of the usage data, determination of a partitioning scheme to be implemented may fall to the partitioning engine 314. Details on partitioning schemes and determining the partitioning scheme may be found in the description of the process 500 of FIG. 5. Once a repartition scheme for the live volume 308 is determined, the volume may be repartitioned according to the scheme in various ways. In some implementations, the partitions of the live volume 308 may be adjusted in size, and data may be redistributed among the partitions by a background process that distributes the data according to the repartition scheme. In another implementation, repartitioning may be accomplished by configuring the new volume 316 according to the partition scheme. In this implementation, the live volume 308 may be detached from a respective virtual machine instance and taken offline, and the data on the live volume 308 may be migrated from the live volume 308 to the new volume 316. Then, the new volume 316 may be attached to the respective virtual machine instance in place of the live volume 308. In some cases, data may be migrated by making a snapshot of the live volume 308, storing the snapshot in a data store, and restoring the snapshot to the new volume 316. In other cases, the data may be migrated by copying the data from the live volume 308 to the new volume 316 directly.

As an alternative method in this implementation, the live volume 308 may remain online/attached during the data migration but all modifications (e.g., writes, deletions, updates, etc.) to the live volume 308 may be halted or frozen. Under this method, once the new volume 316 is attached in place of the live volume 308, the modifications may be allowed to resume on the new volume 316. As still another alternative method, the live volume 308 may remain online/attached during the data operation, but all modifications to the live volume 308 during the data migration may be logged and replicated to the new volume 316 after the data migration is complete. Then, when the logged modifications have been made to the new volume 316, the live volume 308 may be detached and the new volume 316 may be attached in its place; in this way, the new volume 316 may replace the live volume 308 without interruption to the customer of the computing resource service provider.

In some cases, input/output operations may occur to the volume partition in an uneven profile, resulting in hot spots where specific, frequently accessed data is located. In some embodiments, the system of the present disclosure is configured to automatically repartition and/or change the stripe size for data determined to be data likely to cause a hot spot. For example, if, after analyzing usage of a volume, the system of the present disclosure determines that particular chunks of data are causing hot spots in a volume, the system may take a snapshot of the volume, and restore the snapshot by writing the data to a repartitioned volume. In this case, as the snapshot is restoring the data that causes hot spots, the stripe size may be decreased such that the hot spot data is more evenly distributed over the partition/drive array. For example, as the volume data is written, a gigabyte of frequently accessed data may be written to the partitions with a first stripe size and the remaining terabytes of the volume data may be written to the partitions using a second stripe size.

Figure 4:
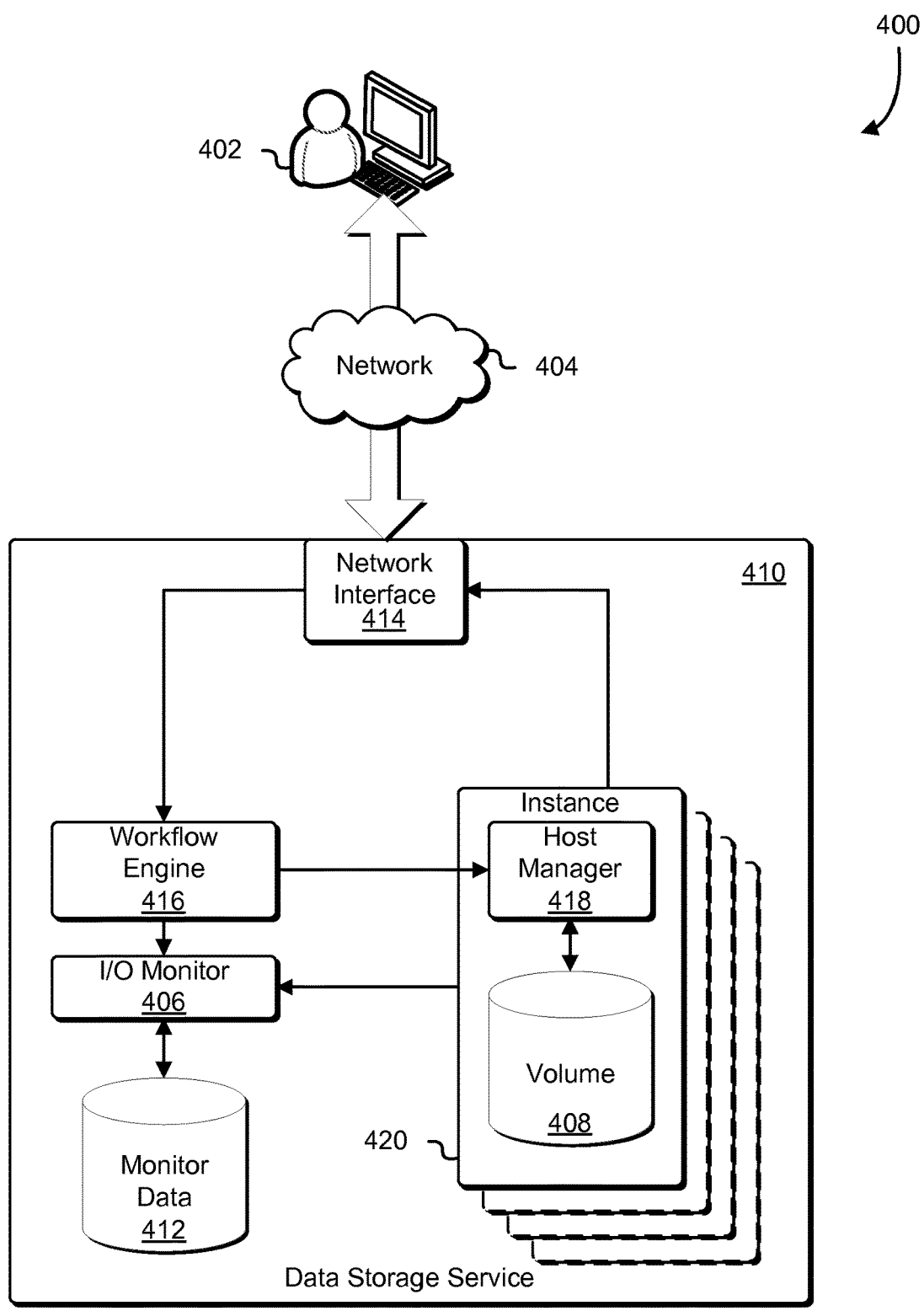
FIG. 4 illustrates an example of data storage service in accordance with an embodiment.

FIG. 4 illustrates an example of a data storage service implementation 400 in which an embodiment of the present disclosure may be practiced. As illustrated in FIG. 4, the data storage service implementation 400 may include a customer 402 of a computing resource service provider, such as the computing resource service provider 702 of FIG. 7 making application programming interface calls through a network 404 and a network interface 414 of a data storage service 410 to receive requests, such as requests related to accessing a data storage volume 408 on a data storage instance of a set of data storage instances 420. The customer 402 may be able to access the data storage volume through an interface configured to make application programming interface calls to the data storage service 410. Note that the customer 402 is depicted as an individual for illustration purposes only, and the data storage service 410 may receive instructions from any authorized user, application, service, device, virtual machine, or resource configured to make application programming interface calls to the data storage service 410.

The request of the customer 402 may be routed to a workflow engine 416 configured to schedule a workflow in accordance with the request. In this context, a workflow may be a sequence of tasks that must be performed to fulfill the request of the customer 402. In some implementations, the workflow engine 416 may be one or more replicated state machines configured to manage and report the state of processing performed by the set of data storage instances 420. Examples of tasks managed by the workflow engine may include tasks for creating the data storage volume 408, taking a snapshot of the data storage volume 408, attaching the data storage volume 408 to a virtual machine instance, writing data to the data storage volume 408, reading data from the data storage volume 408, deleting data from the data storage volume 408, detaching the data storage volume 408 from a virtual machine instance, and deleting the data storage volume 408.

The data storage service 410 may also include an input/output monitor 406, such as the input/output monitor 306 of FIG. 3. The input/output monitor 406 may be a software application that, when executed by one or more processors of a computer system, gathers information about the input/output profiles of the data storage volume 408 and stores it in a data store 412. Note that the data store 412 need not be on the same physical machine as the input/output monitor 406; in some cases the data store 412 may be in a volume of a data storage instance of the set of data storage instances 420 or may be stored at a different data storage service, such as an on-demand data storage service such as the on-demand data storage service 714 of FIG. 7.

Each data storage instance of the set of data storage instances 420 may include the data storage volume 408 and a host manager 418 configured to provide access to the data storage volume 408. In some examples, the host manager 418 may be an application that, when executed by one or more processors of a computer system, manages processing of tasks received by the workflow engine 416 to be performed on the data storage volume 408. The host manager 418 may also be configured to, when executed, report the state of the data storage volume 408 and the state of the respective data storage instance. In some implementations, the host manager 418 may be configured to only be accessible by components of the data storage service 410, and may not be directly accessible to the customer 402 or other outside entity. The host manager 418 may be responsible for performing tasks such as provisioning new data storage volumes, writing to the data storage volumes, reading from the data storage volumes, and deleting the data storage volumes. The host manager 418 may also monitor the health of the data storage volume 408, and may be configured to perform data restoration functions or restart the data storage volume 408 if errors are detected.

The input/output monitor 406 may receive information from the host manager 418 related to the input/output operations performed to data storage volume 408, and store the information in the data store 412. The information stored in the data store 412 may be used by an analytics engine or partitioning engine to determine whether and how a new data storage volume should be partitioned or to determine whether and how to repartition an existing data storage volume 408.

A request received from the customer 402 may be directed to the network interface 414 from the network 404 to be routed to the workflow engine 416, or, in embodiments not having a separate workflow engine, to an appropriate data storage instance of the set of data storage instances 420. Likewise, the network interface 414 may be configured to route communication from a data storage instance to the customer 402. The network 404 may be any appropriate communication network, including an intranet, the Internet, a cellular network, a local area network, or a satellite network. The network interface 414 may be a gateway router which may be configured to act as a bridge to provide access to outside networks for components of the data storage service 410 and/or provide access to the components of the data storage service 410 for outside networks. In this manner, a data storage instance may be reconfigured or replaced without affecting the way (e.g., by referencing an internet protocol address, etc.) that the customer 402 accesses the data storage instance.

Figure 5:
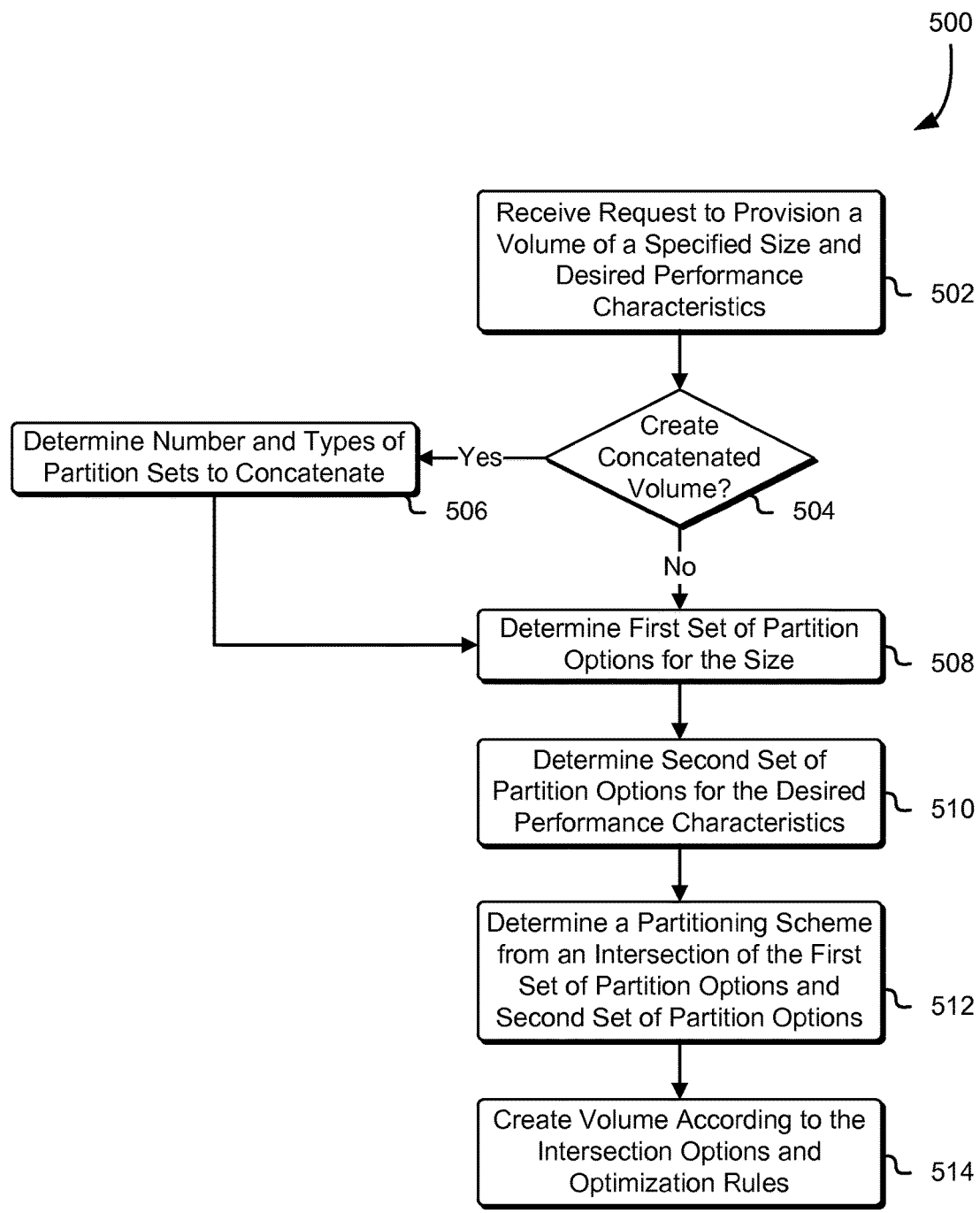
FIG. 5 is a flow chart that illustrates an example of provisioning a volume in accordance with an embodiment.

FIG. 5 is a block diagram illustrating an example of a process 500 for determining a partitioning scheme for a data storage volume in accordance with various embodiments. The process 500 may be performed by any suitable system such as a computer system of a data storage service of a computing resource service provider, or any electronic client device such as the electronic client device 802 described in conjunction with FIG. 8. The process 500 includes a series of operations wherein a customer of a computing resource service provider requests creation of a volume having a specified size and input/output operations per second, the system determines one or more partitions to create, and creates a volume comprising those one or more partitions.

In 502, the system performing the process 500 may receive a request from a customer to create a data storage volume having a specified size and/or desired performance characteristics (e.g., number of input/output operations per second). For example, the system performing the process may receive a request to create a 12-terabyte volume that supports 20,000 input/output operations per second. The system performing the process 500, as a part of the process of determining the partitioning scheme and creating the volume, may generate a unique identifier for the volume ("volume ID"), and respond to the customer's request with the volume ID and notice that the volume status is "creating."

Some embodiments of the present disclosure contemplate concatenated volumes, wherein a volume comprises one or more partitions on one or more separate physical machines. For these embodiments, in 504, a determination is made whether a concatenated volume is desired. For example, in an implementation where a single stripe set is constrained to a maximum stripe width (e.g., where a single physical machine hosts 16 drives and may consequently be limited to a stripe width of 16), concatenation may enable volume sizes that would have been otherwise constrained by the maximum stripe width. In such cases, such as where a customer requests to create a volume larger than may be supported on a single physical machine, the system performing the process 500 may proceed to 506. Otherwise, if volume concatenation is not supported or not desired, the system performing the process 500 may proceed instead to 508.

The operations of 506 apply to embodiments of the present disclosure wherein concatenating stripe sets is contemplated. As noted, in some cases, volume concatenation may be used to provide for creation of larger volumes. In an example, the maximum stripe width of a single stripe set on a physical system may be 16. In such a case, if a customer of a computing resource service provider requests creation of a 32-terabyte volume, embodiments of the present disclosure create a stripe set of width 16 on one physical system and a stripe set of width 16 on another physical system. Then, the system of the present disclosure may concatenate both stripe sets to appear as a single 32-terabyte volume to the customer. In some embodiments, concatenation can be used to combine stripe sets using different types of hard drives. For example, magnetic hard drives and solid-state device hard drives have different performance characteristics and, as in the above example, a 16-terabyte stripe set on magnetic hard drives may be concatenated with a 16-terabyte stripe set on solid-state device hard drives in order to produce a 32-terabyte volume that may be utilized to take advantage of the performance characteristics of the different types of hard drives. Therefore, in 506, the size and number of partition sets may be determined and the system performing the process 500 may proceed to 508-10 to determine size and number of partitions for each partition set of the concatenated volume.

In 508, a set of partition options for creating a volume of the specified size may be determined. Using the above example request for a 12-terabyte volume, the partitioning engine may determine that the drive array in the physical system designated for hosting the volume has 16 two-terabyte hard drives. Based on the quantity and size of the hard drives, the partitioning engine may determine that it can create a 12-terabyte volume in the following configurations:

| Partitions | Partition Size | Total |
|---|---|---|
| 6 | 2 TB | 12 TB |
| 7 | 1.71 TB | 12 TB |
| 8 | 1.5 TB | 12 TB |
| 9 | 1.33 TB | 12 TB |
| 10 | 1.2 TB | 12 TB |

-continued

| Partitions | Partition Size | Total |
|---|---|---|
| 11 | 1.09 TB | 12 TB |
| 12 | 1 TB | 12 TB |
| 13 | 923 GB | 12 TB |
| 14 | 857 GB | 12 TB |
| 15 | 800 GB | 12 TB |
| 16 | 750 GB | 12 TB |

Note that, in some cases a maximum size of a single volume may be dictated by hardware constraints or may be determined by the computing resource service provider. For example, if the data storage service is limited to partitions less than or equal to one-terabyte, any partition options exceeding one-terabyte partitions may be omitted.

In 510, a set of partition options for creating a volume having the specified performance characteristics may be determined. Using the above example request for a 20,000 input/output operations per second volume, the partitioning engine may determine that each drive of the drive array in the physical system designated for hosting the volume is capable of 2,000 input/output operations per second. Based on the number of input/output operations per second per drive, the partitioning engine may determine that it can create a volume having 20,000 input/output operations per second in the following configurations:

| Partitions | Input/Output Operations per Second per Partition | Total Input/Output Operations per Second |
|---|---|---|
| 10 | 2,000 | 20,000 |
| 11 | 2,000 | 22,000 |
| 12 | 2,000 | 24,000 |
| 13 | 2,000 | 26,000 |
| 14 | 2,000 | 28,000 |
| 15 | 2,000 | 30,000 |
| 16 | 2,000 | 32,000 |

Note that additional or alternative sets of partitioning options may be determined based on different criteria. For example, instead of partitioning options based on performance characteristics of the input/output operations per second described above, a partitioning engine may generate a set of partitioning options based on site partitioning (e.g., physical locations of the storage media within a data center or between data centers). As another example, instead of the input/output operations per second partitioning options, a partitioning engine may generate a set of partitioning options based on latency partitioning. In some examples, "latency partitioning" may be based on an average delay required to locate requested data for each drive in the drive array.

In 512, the system performing the process 500 makes a determination of a partitioning scheme for creating the volume based at least on the first and second sets of partition options, such that the partitioning scheme satisfies both the specified size and desired performance criteria from 502. In some embodiments, the determination is based on where the number of partitions intersect for the different options determined by the partitioning engine. Using the above example, a 12-terabyte volume with 20,000 input/output operations per second, may be achieved using 10-16 partitions. The partitioning engine may also utilize additional optimization criteria (e.g., additional sets of rules, supplementary prioritization schemes) for determining the partitioning scheme.

For example, an optimization criteria may indicate that the intersecting partitioning option which most closely meets or exceeds the service-level agreement should be selected. In the above example, the partitioning scheme of ten 1.2-terabyte partitions may be selected as it yields the number of input/output operations per second that most closely meets or exceeds the service-level agreement for a 12-terabyte volume with 20,000 input/output operations per second.

In some embodiments, additional factors are considered in determining how the volume should be created. These factors may figure into a decision tree for determining the particular partitioning scheme. For example, one additional factor may be the type of volume that is being created; i.e., whether the volume is intended to be a boot volume or a data volume. This additional factor may also vary according to the particular operating system on the boot volume or file system on the data volume. Still another factor may be based on historical information about the customer for whom the volume is being created. For example, based on information gathered about the usage of previous volumes of the customer, a partition scheme may be determined that would allow the new volume to perform well if the new volume is utilized in a similar manner as the previous volumes. A different or alternative factor may be based on historical information about other customers, similar volumes of other customers, or the intended use of the volume. For example, if the computing resource service provider has knowledge that a certain software package (e.g., particular database product, etc.) is to be installed on the volume and the computing resource service provider has accumulated information about how execution of the software package performs according to different partitioning schemes, the computing resource service provider may factor this accumulated information into determining the appropriate partitioning scheme for the volume.

Finally, in 514, the system performing the process 500 may generate the volume based on the partitioning scheme selected in 512. That is, the partitions of the specified sizes may be created on their respective hard disks in a hard drive array and the volume may be configured to stripe across these volumes. In some cases, the optimization of the present disclosure may have optimization criteria for minimizing the amount of resources being consumed while still complying with a service-level agreement between the customer and the computing resource service provider. That is, the service-level agreement may include one or more performance criteria guaranteed by the computing resource service provider and/or required by the customer. For example, the computing resource service provider may guarantee or the customer may require that the volume perform at a certain number of input/output operations per second, have a minimum or maximum stripe width, or have a minimum amount of latency. In this context, the amount of resources being consumed may be a measurement of one or more factors, including an amount of space taken up by a volume, an amount of wasted space caused by the partitioning scheme of the volume, and amount of hot spots aggregated within the volume. This optimization criteria thereby allows the computing resource service provider to make the most efficient use of resources while providing the performance the customer expects to get from the volume. Once the volume is generated, the system performing the process may notify the customer that the status of the volume is "created," and, in some cases, the system performing the process 500 may automatically attach the created volume to a specified virtual machine instance. In some cases, the optimization may be to meet other performance criteria, such as internal performance criteria of the computing resource service provider. For example, the optimization may be to keep latency at or below a certain level.

Note that in some implementations, a customer may only specify a volume size and the computing resource service provider may determine a partitioning scheme based on the set of partitioning options determined in 508. Alternatively, a customer may only specify a volume size and the computing resource service provider may provide its own criteria for determining the performance characteristics to be achieved for the requested volume for the set of partitioning options of 510. For example, the computing resource service provider may specify an amount of input/output operations per second or determine a minimum or average number of input/output operations per second for the volume based at least in part on the requested volume size. An example of this determination may be that, for volumes under 16-terabytes, the number of input/output operations per second should be 1,000 input/output operations per second per terabyte, whereas the number of input/output operations per second for volumes greater than 16-terabytes should be 16,000 input/output operations per second. Note also that one or more of the operations performed in 502-14 may be performed in various orders and combinations, including in parallel.

Figure 6:
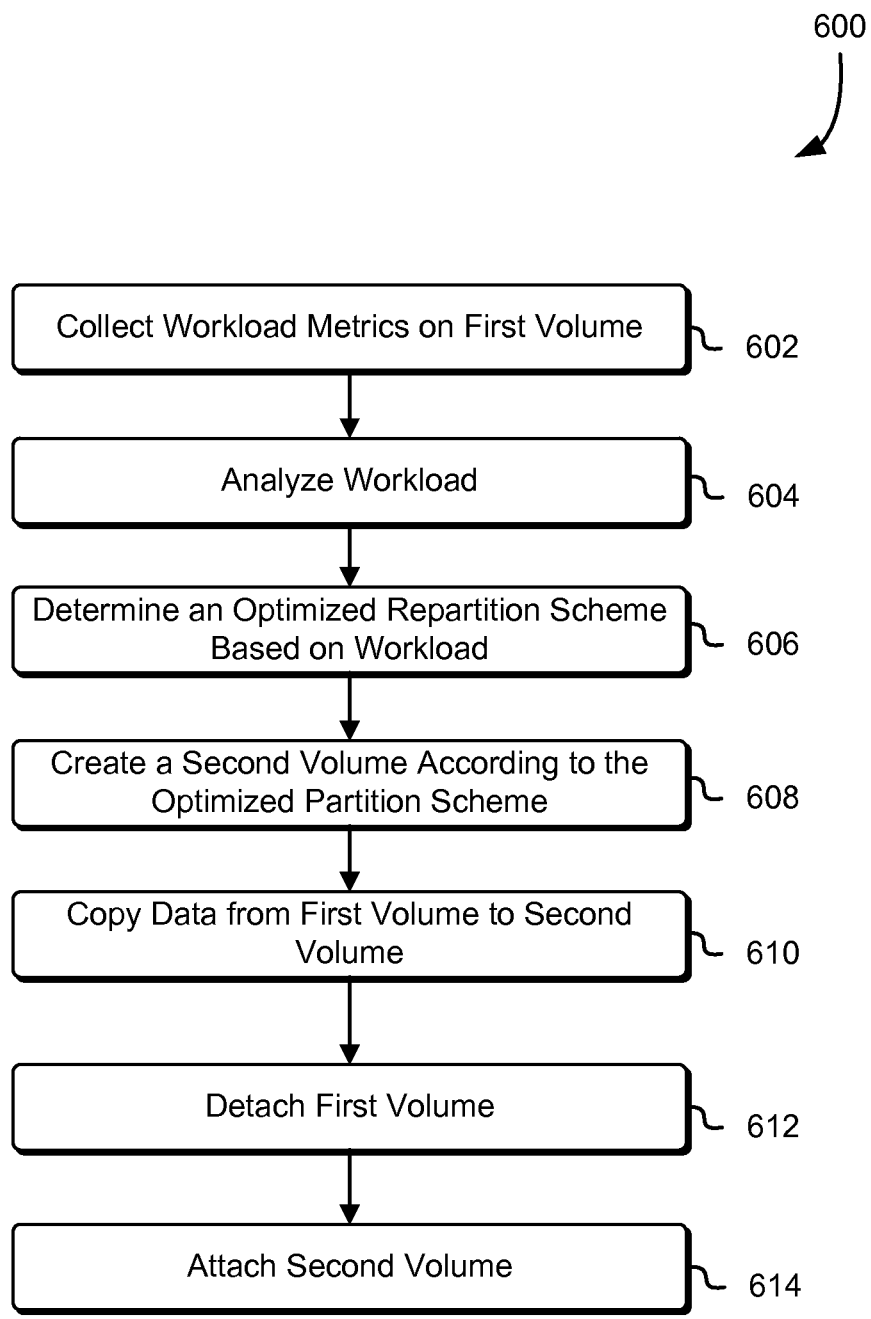
FIG. 6 is a block diagram that illustrates an example of repartitioning a volume based on analyzing a workflow in accordance with an embodiment.

FIG. 6 is a block diagram illustrating an example of a process 600 for repartitioning a volume based on a workload in accordance with various embodiments. The process 600 may be performed by any suitable system such as a computer system of a data storage service of a computing resource service provider, or any electronic client device such as the electronic client device 802 described in conjunction with FIG. 8. The process 600 includes a series of operations wherein workload metrics are collected and analyzed, and, based on the workload metrics, a determination of a repartition scheme is made, and new volume is implemented according to the repartition scheme to replace the old volume.

In 602, the workload for the volume may be tracked over time, such as by an input/output monitor similar to the input/output monitors 406 and 306 of FIGS. 3 and 4 respectively. In some examples, "workload" may refer to the input/output profile of a volume; e.g., read operations, write operations, and delete operations that are performed and/or scheduled as jobs to be performed. Information about the workload may also be tracked, including location of the data block or blocks affected by the workload, time when the job was scheduled, when the job was started, amount of time to complete the job, errors that occurred during the workload processing, and other such data. From this data, the number of input/output operations per second for a volume may also be determined.

In 604, the tracked workload information may be analyzed to determine whether the volume should be repartitioned. The amount of time the workload may be tracked before performing the analysis of 604 may vary depending on factors such as the volume type, the amount of workload information collected, information associated with the customer owner of the volume, usage information for similar volumes, the expected lifespan of the volume, and the age of the volume. The factors may be used to estimate an input/output volume profile. The estimate of an input/output profile may be based on one or more of the tracked input/output profiles of the volume, past input/output profiles of other volumes associated with the customer of the current volume, and past input/output profiles of other volumes with similar characteristics to the volume. Examples of volumes determined to have similar characteristics include volumes of a similar type (boot volume, data volume, etc.), volumes similar in size, volumes with similar types of data, volumes associated with similar services, and volumes associated with software applications. In some cases, the workload information may be useful to analyze early in the expected lifespan of the volume, such as within 24 to 48 hours of the volume's initial creation. In other cases, workload information may be tracked for longer periods before analyzing the workload.

In 606, the system performing the process 600 may determine a partitioning scheme based at least in part on the tracked workload information. For example, the analyzed workflow information may indicate that, based on current workload or workload trend over time, that the volume should be partitioned into a wider stripe set with a smaller stripe size in order remain in compliance with specified performance criteria, such as desired input/output operations per second or throughput. As another example, the analyzed workflow information may indicate that, based on an estimated lifespan of the volume and the age of the volume within that lifespan, that the volume is likely to run out of storage space. In this example, the partitioning scheme may be determined to achieve an increase in volume size while maintaining or exceeding the current level of input/output operations per second of the volume.

In 608, a second volume may be partitioned according to the partitioning scheme determined in 606. For example, the current volume may be comprised of an unstriped, 500 gigabyte partition on a single drive, and a partitioning scheme based on the workload information may specify a volume comprised of five 100 gigabyte partitions. For this example, the system performing the process 600 may create 100 gigabyte partitions on each of five different hard drives to form a new volume.

In 610, data from the live volume may be copied to the new (second) volume from the old (first) volume. In some embodiments, this copying (also referred to as replication), may be performed transparently (i.e., undetectable) to the customer and while the live volume is still live, such as by copying data sector-by-sector while still allowing reads and writes to the live volume. In other embodiments, the live volume may be taken offline to perform the copy more quickly. In still other embodiments, the live volume may be backed up and/or imaged, and the backup or image restored to the new volume, and any incremental changes to the live volume during this restoration time may be queued and performed on the new volume after restoration is complete. In still other embodiments, data may be copied or transferred to the new volume through an incremental demand loading scheme.

Once the data on the second volume has been brought up-to-date, in 612 the old volume may be detached from the computer system or virtual machine instance to which it is attached, and, in 614, the new volume may be attached in its place. The detachment/attachment operations of 612 and 614 may be performed transparently (e.g., with an undetectably small delay) to the customer and other users. That is, the detachment operations of the first volume and attachment operations of the second volume in place of the first volume may be, in total, may be completed within less than 100 milliseconds (e.g., ten milliseconds), such that operations being performed on the computer system (e.g., reads and writes to or from the volumes) are not interrupted or significantly delayed.

Note that, in alternate embodiments, the operations of 610-12 may not be performed or may be performed in a variety of different manners. For example, in some cases, rather than detaching the old volume, the old volume may be rendered read only and input/output operations may be performed in parallel by the new and old volumes for some period of time. In this example, to the customer, the new and old volumes may appear to be the same volume, however, new data and updates may be written to and read (read-write) from the new volume, while read requests for old data may be fulfilled by reading from the old volume (read-only). Over time, the requests for old data may occur less and less frequently. In this manner, the old volume may not be detached at all, may not be detached until such point as it is no longer needed, or may be detached when read requests decrease below a predetermined threshold and any remaining old data is copied to the new volume, thereby minimizing or eliminating any impact of detaching the old volume. Alternately, a variation of this, may be that an overlay of data may be initially copied to the new volume and the new volume may be brought up-to-date via an incremental demand loading scheme (e.g., as customers read data from the old volume, the data may be written to the new volume and erased from the old volume or flagged as copied). Thus usage of the term "copy" and "copying" in this context may be understood to encompass various methods of rendering the new volume suitable for reading and writing in a manner transparent to the customer.

Note that one or more of the operations performed in 602-20 may be performed in various orders and combinations, including in parallel. Note also that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 7:
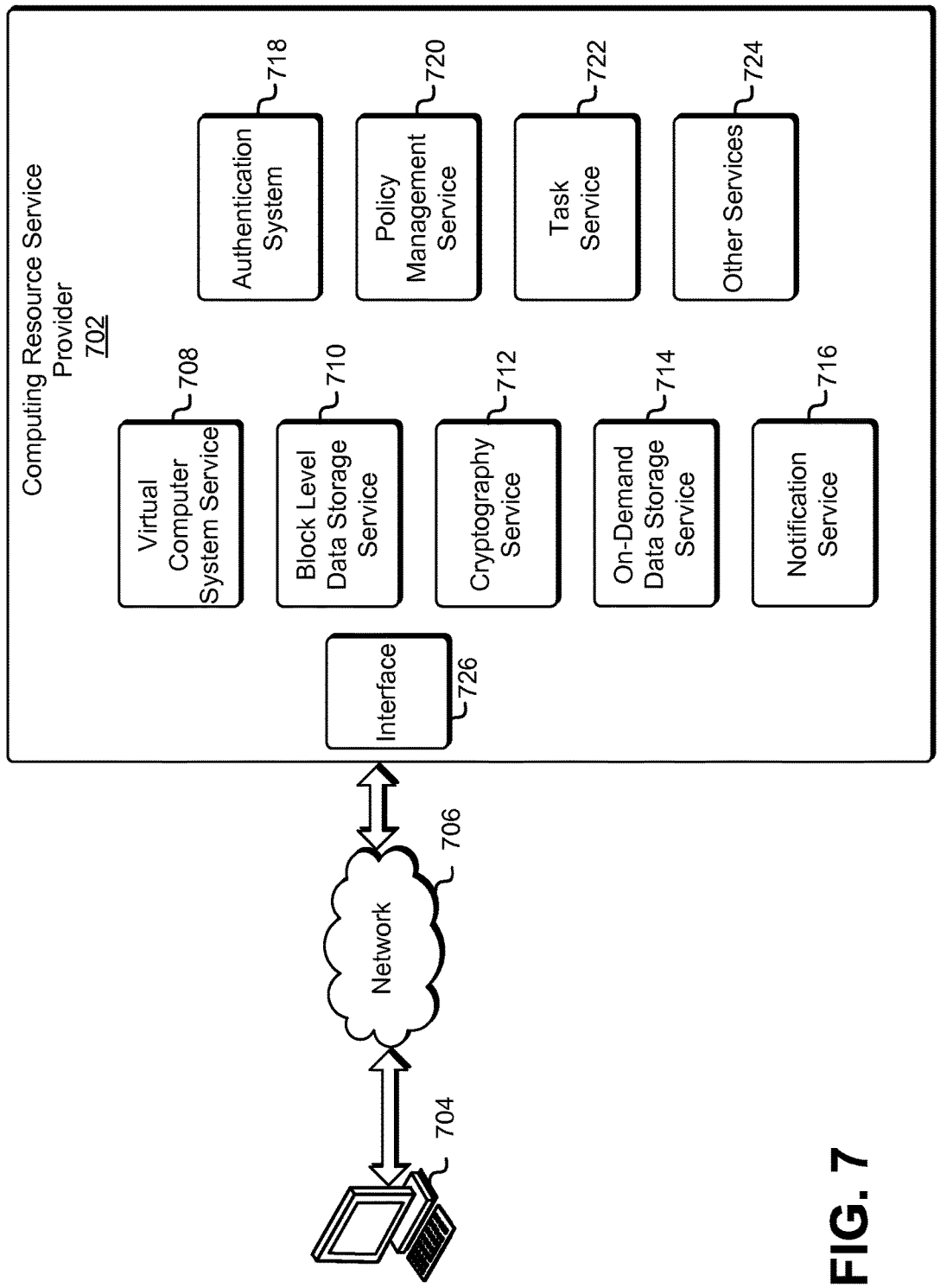
FIG. 7 illustrates an example of a computing resource service provider in accordance with an embodiment.

FIG. 7 shows an example of a customer connected to a computing resource service provider in accordance with at least one embodiment. The computing resource service provider 702 may provide a variety of services to the customer 704 and the customer 704 may communicate with the computing resource service provider 702 via an interface 726, which may be a web services interface or any other type of customer interface. While FIG. 7 shows one interface 726 for the services of the computing resource service provider 702, each service may have its own interface and, generally, subsets of the services may have corresponding interfaces in addition to or as an alternative to the interface 726. The customer 704 may be an organization that may utilize one or more of the services provided by the computing resource service provider 702 to maintain and deliver information to its employees, which may be located in various geographical locations. Additionally, the customer 704 may be an individual that utilizes the services of the computing resource service provider 702 to deliver content to a working group located remotely. As shown in FIG. 7, the customer 704 may communicate with the computing resource service provider 702 through a network 706, whereby the network 706 may be a communication network, such as the Internet, an intranet or an Internet service provider (ISP) network. Some communications from the customer 704 to the computing resource service provider 702 may cause the computing resource service provider 702 to operate in accordance with one or more embodiments described or a variation thereof.

The computing resource service provider 702 may provide various computing resource services to its customers.

The services provided by the computing resource service provider 702, in this example, include a virtual computer system service 708, a block-level data storage service 710, a cryptography service 712, an on-demand data storage service 714, a notification service 716, an authentication system 718, a policy management service 720, a task service 722 and one or more other services 724. It is noted that not all embodiments described include the services 708-24 described with reference to FIG. 7 and additional services may be provided in addition to or as an alternative to services explicitly described. As described, each of the services 708-24 may include one or more web service interfaces that enable the customer 704 to submit appropriately configured API calls to the various services through web service requests. In addition, each of the services may include one or more service interfaces that enable the services to access each other (e.g., to enable a virtual computer system of the virtual computer system service 708 to store data in or retrieve data from the on-demand data storage service 714 and/or to access one or more block-level data storage devices provided by the block level data storage service 710).

The virtual computer system service 708 may be a collection of computing resources configured to instantiate virtual machine instances on behalf of the customer 704. The customer 704 may interact with the virtual computer system service 708 (via appropriately configured and authenticated API calls) to provision and operate virtual computer systems that are instantiated on physical computing devices hosted and operated by the computing resource service provider 702. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 708 is shown in FIG. 7, any other computer system or computer system service may be utilized in the computing resource service provider 702, such as a computer system or computer system service that does not employ virtualization or instantiation and instead provisions computing resources on dedicated or shared computers/servers and/or other physical devices.

The block-level data storage service 710 may comprise one or more computing resources that collectively operate to store data for a customer 704 using block-level storage devices (and/or virtualizations thereof). The block-level storage devices of the block-level data storage service 710 may, for instance, be operationally attached to virtual computer systems provided by the virtual computer system service 708 to serve as logical units (e.g., virtual drives) for the computer systems. A block-level storage device may enable the persistent storage of data used/generated by a corresponding virtual computer system where the virtual computer system service 708 may only provide ephemeral data storage.

The computing resource service provider 702 also includes a cryptography service 712. The cryptography service 712 may utilize one or more storage services of the computing resource service provider 702 to store keys of the customers in encrypted form, whereby the keys may be usable to decrypt the customer 704 keys accessible only to particular devices of the cryptography service 712.

The computing resource service provider 702 further includes an on-demand data storage service 714. The on-demand data storage service 714 may be a collection of computing resources configured to synchronously process requests to store and/or access data. The on-demand data storage service 714 may operate using computing resources (e.g., databases) that enable the on-demand data storage service 714 to locate and retrieve data quickly, to allow data to be provided in responses to requests for the data. For example, the on-demand data storage service 714 may maintain stored data in a manner such that, when a request for a data object is retrieved, the data object can be provided (or streaming of the data object can be initiated) in a response to the request. As noted, data stored in the on-demand data storage service 714 may be organized into data objects. The data objects may have arbitrary sizes except, perhaps, for certain constraints on size. Thus, the on-demand data storage service 714 may store numerous data objects of varying sizes. The on-demand data storage service 714 may operate as a key value store that associates data objects with identifiers of the data objects which may be used by the customer 704 to retrieve or perform other operations in connection with the data objects stored by the on-demand data storage service 714.

In the environment illustrated in FIG. 7, a notification service 716 is included. The notification service 716 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 716 may provide notifications to clients using a "push" mechanism without the need to periodically check or "poll" for new information and updates. The notification service 716 may further be used for various purposes such as monitoring applications executing in the virtual computer system service 708, workflow systems, time-sensitive information updates, mobile applications, and many others.

As illustrated in FIG. 7, the computing resource service provider 702, in various embodiments, includes an authentication system 718 and a policy management service 720. The authentication system 718, in an embodiment, is a computer system (i.e., collection of computing resources) configured to perform operations involved in authentication of users of the customer. For instance, one of the services 708-16 and 720-24 may provide information from a user to the authentication system 718 to receive information in return that indicates whether the user requests are authentic.

The policy management service 720, in an embodiment, is a computer system configured to manage policies on behalf of customers (such as customer 704) of the computing resource service provider 702. The policy management service 720 may include an interface that enables customers to submit requests related to the management of policy. Such requests may be, for instance, requests to add, delete, change, or otherwise modify policy for a customer or for other administrative actions, such as providing an inventory of existing policies and the like.

The computing resource service provider 702, in various embodiments, is also equipped with a task service 722. The task service 722 is configured to receive a task package from the customer 704 and enable executing tasks as dictated by the task package. The task service 722 may be configured to use any resource of the computing resource service provider 702, such as one or more instantiated virtual machines or virtual hosts, for executing the task. The task service 722 may configure the one or more instantiated virtual machines or virtual hosts to operate using a selected operating system and/or a selected execution application in accordance with a requirement of the customer 704.

The computing resource service provider 702 additionally maintains one or more other services 724 based at least in part on the needs of its customers 704. For instance, the computing resource service provider 702 may maintain a database service for its customers 704. A database service may be a collection of computing resources that collectively operate to run one or more databases for one or more customers 704. The customer 704 may operate and manage a database from the database service by utilizing appropriately configured API calls. This, in turn, may allow a customer 704 to maintain and potentially scale the operations in the database. Other services include, but are not limited to, object-level archival data storage services, services that manage and/or monitor other services.

Figure 8:
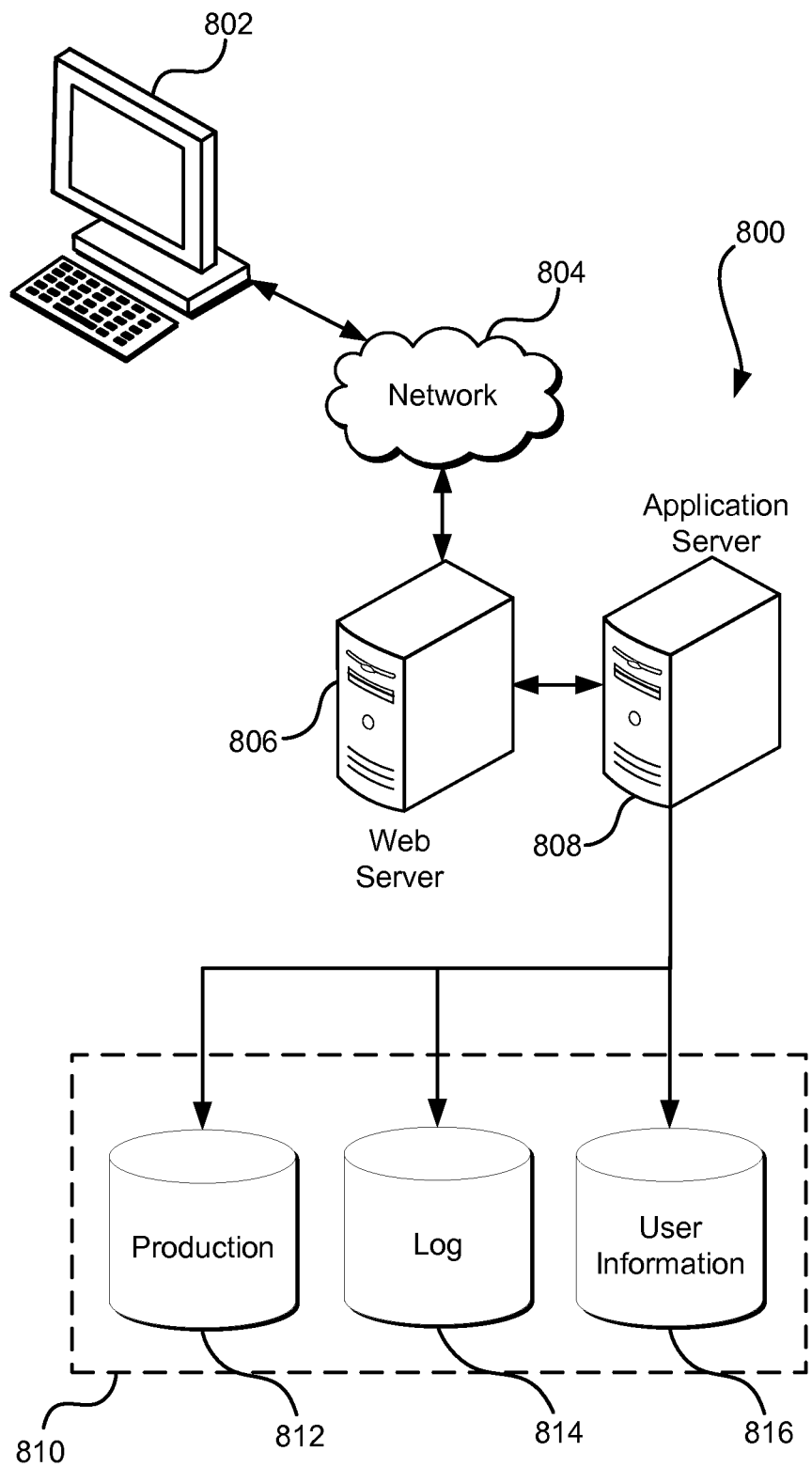
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes an application server 808 and a data store 810. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, forms that are perceptible to the user audibly, visually and/or through other senses including touch, taste, and/or smell. The handling of all requests and responses, as well as the delivery of content between the electronic client device 802 and the application server 808, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the example environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    tracking input/output operations of a first volume provided by a data storage service to a customer of a computing resource service provider, wherein the first volume is a logical storage space, comprised of a set of data storage partitions within a data storage system according to a first partitioning scheme, in which data objects may be stored and wherein the first volume is attached to a computer system instance of a computer system service such that an operating system of the computer system instance recognizes the first volume and is able to perform the input/output operations with the first volume;
    analyzing the tracked input/output operations to determine an input/output profile for the first volume;
    determining, based at least in part on the determined input/output profile, to change the first partitioning scheme;
    determining a second partitioning scheme based at least in part on the determined input/output profile to fulfill a set of optimization criteria that at least specifies a size and number of partitions for a set of persistent computer-readable storage media, wherein the set of optimization criteria reduces an amount of resources of the data storage service consumed while meeting or exceeding a service-level agreement threshold;
    provisioning a second volume comprised of the size and number of partitions specified by the second partitioning scheme;

copying the data objects from the first volume and the first partitioning scheme to the second volume and the second partitioning scheme;

detaching the first volume from the computer system instance; and attaching the second volume to the computer system instance such that the operating system of the computer system instance recognizes the second volume and is able to perform the input/output operations with the second volume and the second partitioning scheme instead of the first volume and the first partitioning scheme.

2. The computer-implemented method of claim 1, wherein the set of optimization criteria includes criteria to distribute frequently accessed data blocks of a block-level storage device among multiple partitions.

3. The computer-implemented method of claim 1, wherein the set of optimization criteria include criteria for meeting one or more performance criteria.

4. The computer-implemented method of claim 1, wherein determining the second partitioning scheme comprises:

determining a first set of partition options based at least in part on volume size criteria;

determining a second set of partition options based at least in part on desired performance characteristics; and determining the second partitioning scheme based at least in part on the first set of partition options and the second set of partition options.

5. The computer-implemented method of claim 4, wherein the desired performance characteristics are one of desired input/output operations per second, desired throughput, or desired latency.

6. A system, comprising:

one or more processors; and memory including instructions that, as a result of execution by the one or more processors, cause the system to:

receive a request to provision a volume of a specified size;

determine a first set of partition options based at least in part on the specified size;

determine a second set of partition options based at least in part on one or more performance characteristics;

determine a partition scheme based at least in part on an intersection of a number of partitions between the first set of partition options and the second set of partition options and further based at least in part on a set of optimization criteria, a type of volume being provisioned, and input/output profiles of other volumes of that type; and provision the volume according to the determined partition scheme.

7. The system of claim 6, wherein the instructions that cause the system to receive a request, further includes instructions that, as a result of execution by the one or more processors, cause the system to receive a request to provision the volume with the one or more performance characteristics.

8. The system of claim 6, wherein the set of optimization criteria includes criteria for keeping wasted space at or below a threshold.

9. The system of claim 6, wherein the set of optimization criteria include one or more criteria to spread utilization uniformly among partitions of the volume or reduce a likelihood of correlated load.

10. The system of claim 6, wherein the one or more performance characteristics are determined based at least in part on the specified size.

11. The system of claim 6, wherein the volume is provided by a data storage service to a customer of a computing resource service provider and the partition scheme is further determined based at least in part on input/output profiles of other volumes that have been provided to the customer by the data storage service.

12. A non-transitory computer-readable storage medium having stored thereon executable instructions that, as a result of execution by one or more processors of a computer system, cause the computer system to at least:

determine an input/output profile for a first volume based at least in part on tracked input/output operations of the first volume, wherein the first volume is comprised of a set of data storage partitions according to a first partitioning scheme;

determine a second partitioning scheme for the first volume such that the second partitioning scheme fulfills a set of optimization criteria to reduce an amount of data storage resources consumed, wherein the second partitioning scheme at least specifies a size and number of partitions;

provision a second volume comprised of the size and number of partitions specified by the second partitioning scheme; and replace the first volume and the first partitioning scheme with the second volume and the second partitioning scheme.

13. The non-transitory computer-readable storage medium of claim 12, wherein the instructions further include instructions that, as a result of execution by one or more processors of a computer system, cause the computer system to:

attach the second volume in parallel with the first volume such that the first volume and the second volume appear as a single volume;

render the first volume as read-only; and copy data from the first volume to the second volume while allowing read operations to be performed on the first volume and read-write operations to be performed on the second volume.

14. The non-transitory computer-readable storage medium of claim 12, wherein the instructions that determine to repartition the first volume include instructions that, as a result of execution by the one or more processors, cause the computer system to determine to repartition the first volume based at least in part on receiving a request to change one or more of a size of the first volume or a number of input/output operations per second supported by the first volume.

15. The non-transitory computer-readable storage medium of claim 12, wherein the instructions that replace the first volume with the second volume include instructions that, as a result of execution by the one or more processors, cause the computer system to:

detach the first volume from the computer system such that the first volume is unrecognized by the computer system and the computer system is unable to perform input/output operations with the first volume; and attach the second volume to the computer system such that the computer system recognizes the second volume and is able to perform the input/output operations with the second volume.

16. The non-transitory computer-readable storage medium of claim 15, wherein the first volume is detached from the computer system and the second volume is attached to the computer system such that operations being performed on the computer system are not interrupted.

17. The non-transitory computer-readable storage medium of claim 12, wherein the wherein the second partitioning scheme is determined based at least in part on one or more of volume size, number of input/output operations per second, amount of input/output latency, amount of network path latency, amount of network bandwidth, parameters relating to a system layout of a distributed computing environment, and criteria for reducing wasted space.

18. The non-transitory computer-readable storage medium of claim 12, wherein the instructions that cause the computer system to determine the partitioning scheme further include instructions that, as a result of execution by the one or more processors, cause the computer system to determine whether to concatenate one or more sets of partitions.

19. The non-transitory computer-readable storage medium of claim 12, wherein the instructions that cause the system to determine to repartition the first volume include instructions that, as a result of execution by the one or more processors, cause the system to determine to repartition the first volume based at least in part on a determination that the input/output profile for the first volume has changed.

20. The non-transitory computer-readable storage medium of claim 12, wherein the instructions that move the data from the first volume to the second volume further include instructions that, as a result of execution by the one or more processors, cause the system to change a stripe size on the second volume based at least in part on whether the data on the first volume is frequently accessed.

21. The non-transitory computer-readable storage medium of claim 12, wherein the instructions that cause the system to determine to repartition the first volume include instructions that, as a result of execution by the one or more processors, cause the system to determine to repartition the first volume based at least in part on an expected lifespan of the first volume, wherein the expected lifespan is estimated by comparing the input/output profile against input/output profiles of other volumes.

22. The non-transitory computer-readable storage medium of claim 21, wherein the instructions that cause the system to determine to repartition the first volume include instructions that, as a result of execution by the one or more processors, cause the system to determine to repartition the first volume based at least in part on comparing an age of the first volume with the expected lifespan.

* * * * *